(12) United States Patent
Nagayasu

(10) Patent No.: US 9,180,739 B2
(45) Date of Patent: Nov. 10, 2015

(54) PNEUMATIC TIRE

(75) Inventor: Masaaki Nagayasu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 260 days.

(21) Appl. No.: 13/183,350

(22) Filed: Jul. 14, 2011

(65) Prior Publication Data

US 2012/0018069 A1    Jan. 26, 2012

(30) Foreign Application Priority Data

Jul. 23, 2010   (JP) .................................. 2010-165679

(51) Int. Cl.
*B60C 11/12*     (2006.01)
*B60C 11/03*     (2006.01)
*B60C 11/11*     (2006.01)

(52) U.S. Cl.
CPC ......... *B60C 11/1218* (2013.04); *B60C 11/0306* (2013.04); *B60C 11/11* (2013.01); *B60C 2011/1213* (2013.04)

(58) Field of Classification Search
CPC ............ B60C 11/1204; B60C 11/1218; B60C 11/1236
USPC ............................. 152/209.18, 209.21, DIG. 3
See application file for complete search history.

(56) References Cited

U.S. PATENT DOCUMENTS 4,934,424  A *   6/1990   Kojima .................... 152/209.25
6,681,824  B2    1/2004   Lopez
2002/0139164 A1 * 10/2002  Ishihara ......................... 72/326
2005/0121124 A1   6/2005   Tsubono
2009/0165911 A1 *  7/2009   Ohashi ..................... 152/209.25
2009/0223613 A1   9/2009   Saeki

FOREIGN PATENT DOCUMENTS

| EP | 1170153 | 1/2002 |
|---|---|---|
| EP | 1 533 141 | 5/2005 |
| JP | 3180160 | 3/1993 |
| JP | H08-175115 | 7/1996 |
| JP | 10-080923 | * 3/1998 |
| JP | 3110783 | 11/2000 |
| JP | 3180160 | 4/2001 |

(Continued)

OTHER PUBLICATIONS

English machine translation of JP2002-103921, dated Apr. 2002.*

(Continued)

*Primary Examiner* — Steven D Maki
*Assistant Examiner* — Robert Dye
(74) *Attorney, Agent, or Firm* — Thorpe North & Western

(57) ABSTRACT

A plurality of blocks is provided in a tread portion and a plurality of sipes is provided in a tread surface of the blocks. In the sipes, protrusions are formed on a first sipe wall surface of mutually opposing sipe wall surfaces and recesses that engage with the protrusions are formed on a second sipe wall surface. Collapsing of the portions of the blocks sandwiched by the sipes is suppressed due to the engaging of the protrusions and the recesses. A height of the protrusions provided on the sipe wall surfaces of the sipes located at the edges in the tire circumferential direction is greater than a height of the protrusions provided on the sipe wall surfaces of the other sipes. Specifically, a force that works to suppress bending deformation increases and collapsing of the portions of the blocks located at the edges in the tire circumferential direction is suppressed.

17 Claims, 5 Drawing Sheets

(56) References Cited

FOREIGN PATENT DOCUMENTS

| JP | 2002-103921 | * | 4/2002 |
|---|---|---|---|
| JP | 2002-316517 | | 10/2002 |
| JP | 2004-262285 | | 9/2004 |
| JP | 2005-041339 | | 2/2005 |
| JP | 2005-119415 | | 5/2005 |
| JP | 2006-188185 | | 7/2006 |
| JP | 2006-298055 | * | 11/2006 |
| JP | 2010-064699 | | 3/2010 |
| JP | 2010-064699 | | 3/2013 |
| RU | 2388620 | | 5/2010 |
| WO | WO 9948707 | | 9/1999 |
| WO | WO 2006013694 | | 2/2006 |

OTHER PUBLICATIONS

English machine translation of JP10-080923, dated Mar. 1998.*
English machine translation of JP2006-298055, dated Nov. 2006.*
German Office Action dated Jul. 16, 2012.
Russian Decision of Grant dated Aug. 10, 2012.
Chinese Office Action dated Jun. 25, 2013, 13 pages, China.
Japanese Office Action dated Aug. 20, 2013, 6 pages, Japan.

* cited by examiner

|  | Conventional Example | Working Example 1 | Working Example 2 | Working Example 3 | Working Example 4 |
|---|---|---|---|---|---|
| Circumferential Direction Edge Protrusion Height (mm) | 1.0 | 1.2 | 1.5 | 2.0 | 3.0 |
| Other Region Protrusion Height (mm) | 1.0 | 1.0 | 1.0 | 1.0 | 1.0 |
| Dry Braking | 100 | 101 | 103 | 105 | 105 |
| Wet Braking | 100 | 101 | 103 | 105 | 105 |
| Braking On Ice | 100 | 101 | 103 | 110 | 105 |

| | Conventional Example | Working Example 1 | Working Example 2 | Working Example 3 | Working Example 4 |
|---|---|---|---|---|---|
| Circumferential Direction Edge Recesses and Protrusions Area Proportion | 100 | 120 | 150 | 200 | 300 |
| Other Region Recesses and Protrusions Area Proportion | 100 | 100 | 100 | 100 | 100 |
| Dry Braking | 100 | 101 | 103 | 105 | 105 |
| Wet Braking | 100 | 101 | 103 | 105 | 105 |
| Braking On Ice | 100 | 101 | 103 | 110 | 105 |

# PNEUMATIC TIRE

PRIORITY CLAIM

Priority is claimed to Japan Patent Application Serial No. 2010-165679 filed on Jul. 23, 2010.

BACKGROUND

1. Technical Field

The present technology relates to a pneumatic tire and particularly relates to a pneumatic tire having enhanced tire braking performance on ice.

2. Related Art

Tread patterns in which a plurality of sipes is disposed in a tire pattern in order to enhance braking performance on ice of studless tires are known. Also, in recent years, there has been a tendency toward increasing the number of sipes. However, sipe density is increased as a result of increasing the number of sipes, and while this leads to an increase in the number of edges, it also leads to the problems of the overall rigidity of the block declining and braking performance on ice declining.

Therefore, technology has been proposed in which collapsing of portions of a block that are sandwiched by sipes is suppressed and a decline of block rigidity is suppressed by disposing recesses and protrusions within the sipes (Japanese Patent No. 3180160).

However, in cases where a plurality of blocks are provided in a tread portion by a plurality of vertical grooves extending in the tire circumferential direction and a lateral groove extending in a direction that intersects the tire circumferential direction, and a plurality of sipes spaced in the tire circumferential direction are provided in a tread surface of the blocks, at an area located at edges of the blocks in the tire circumferential direction, a portion of the blocks is partitioned by the sipes and the lateral groove, and at areas other than the edges in the tire circumferential direction, a portion of the blocks is partitioned by adjacent sipes.

Therefore, the portion of the blocks located at the edges in the tire circumferential direction is partitioned by the sipes and a lateral groove having a width greater than that of the sipes, and, compared to portions of blocks located at other areas that are sandwiched by adjacent sipes, these portions only engage with a portion of an adjacent block on one side and, thus, are prone to collapsing.

When there are portions in blocks partitioned by vertical grooves and lateral grooves that are more prone to collapsing than other areas or, rather, when there are portions of the block that collapse more than other areas, it is difficult to enhance the edge effect and enhance braking performance on ice.

SUMMARY

The present technology was devised in light of the problems described above and provides a pneumatic tire that is useful in suppressing collapsing of portions of blocks positioned at edges in the tire circumferential direction and enhancing braking performance on ice.

The present technology is a pneumatic tire including, in a tread portion, a plurality of blocks partitioned by a plurality of vertical grooves extending in a tire circumferential direction and a lateral groove extending in a direction that intersects with the tire circumferential direction. The pneumatic tire also includes, in a tread surface of the blocks, a plurality of sipes spaced in the tire circumferential direction extending in the direction that intersects with the tire circumferential direction. Portions of the blocks partitioned by the lateral groove and the sipes are formed at areas of the blocks located at edges in the tire circumferential direction, and portions of the blocks partitioned by sipes adjacent in the tire circumferential direction are formed in other areas of the blocks. In the sipes, protrusions are formed on a first sipe wall surface of mutually opposing sipe wall surfaces, and recesses that can engage with the protrusions are formed in a second sipe wall surface. The protrusions and the recesses are formed so as to generate a force by engaging that works to suppress bending deformation in the tire circumferential direction of the portions of the blocks. The protrusions and the recesses are formed so that the engaging between the portions of the blocks located at the edges in the tire circumferential direction and the portions of the blocks positioned adjacent to said portions of the blocks generates a force that works to suppress the bending deformation that is greater than the force generated by engaging between the other portions of the blocks.

The portions of the blocks located at the edges in the tire circumferential direction are partitioned by sipes and a lateral groove having a width greater than that of the sipes, and the protrusions and the recesses engage only on one side. Therefore, these portions are more prone to collapsing than the portions of the blocks located at other areas that are partitioned by adjacent sipes.

In the present technology, the engaging at the portions of the blocks located at the edges in the tire circumferential direction and the portions of the blocks positioned adjacent to said portions of the blocks generates a force that works to suppress bending deformation and that is configured so as to be greater than a force generated by engaging at the other portions of the blocks. Thereby, firm engaging is obtained and the collapsing of the portions of the blocks located at the edges in the tire circumferential direction is suppressed.

BRIEF DESCRIPTION OF THE DRAWINGS

FIG. 5A is a perspective view of a cross section of a portion of the block. FIG. 5B is a plan view of a sipe. FIG. 5C is a drawing illustrating the cross-sectional area of the protrusions and the recesses occupied on the sipe wall surface in a state where the sipe wall surface and the sipe are laid open.

DETAILED DESCRIPTION

First Embodiment

Figure 1A:
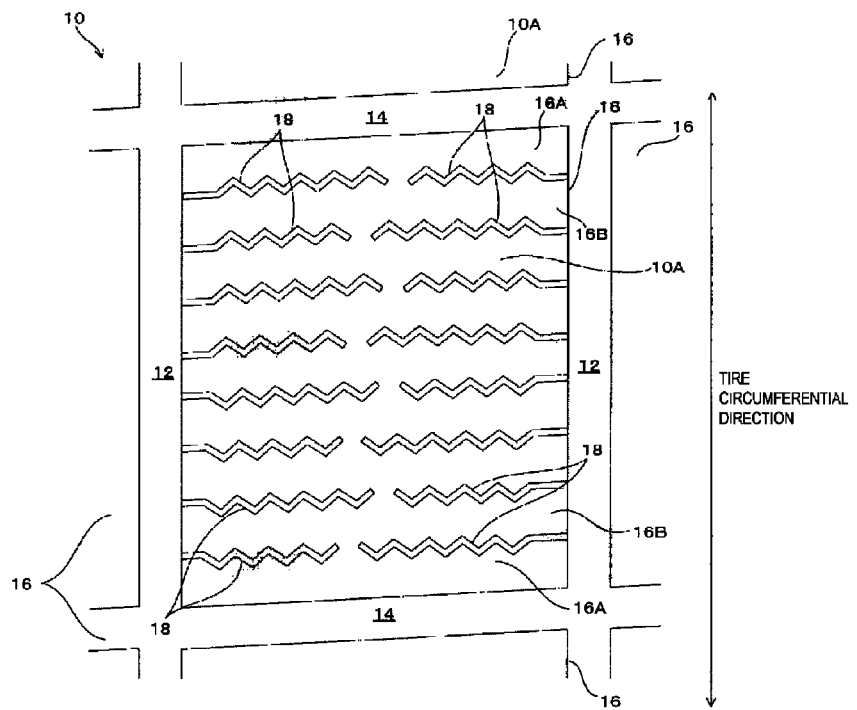
FIG. 1A is a plan view of a block.
Figure 1B:
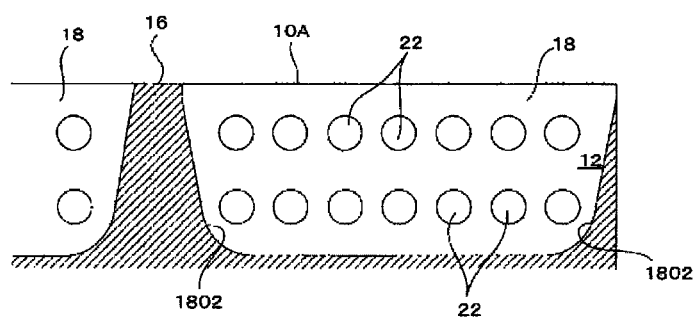
FIG. 1B is a cross-sectional view of a portion of the block that is cut at a portion of the sipes and is also an explanatory view of the protrusions.

As illustrated in FIGS. 1A, 1B, 2A and 2B, a plurality of blocks 16 is provided in a tread portion 10 by a plurality of vertical grooves 12 extending in a tire circumferential direction and lateral grooves 14 extending in a direction that intersects the tire circumferential direction.

A plurality of sipes 18 spaced in the tire circumferential direction are provided in a tread surface 10A of the blocks 16, extending in the direction that intersects with the tire circumferential direction.

Portions 16A of the blocks 16 are partitioned (sandwiched) by the sipes 18 and a lateral groove 14 having a width that is greater than that of the sipes 18 at areas of the blocks 16 located at edges in the tire circumferential direction.

Additionally, portions 16B of the blocks 16 are partitioned (sandwiched) by adjacent sipes 18 at areas of the blocks 16 other than at the edges in the tire circumferential direction.

In order to exert edge effect effectively, a width W of the sipes 18 is preferably 0.3 mm or greater but 1.5 mm or less.

As illustrated in FIG. 1A, a shape in a longitudinal direction of the sipes 18 may be configured as desired and, for example, may extend in a zigzag shape.

Figure 2A:
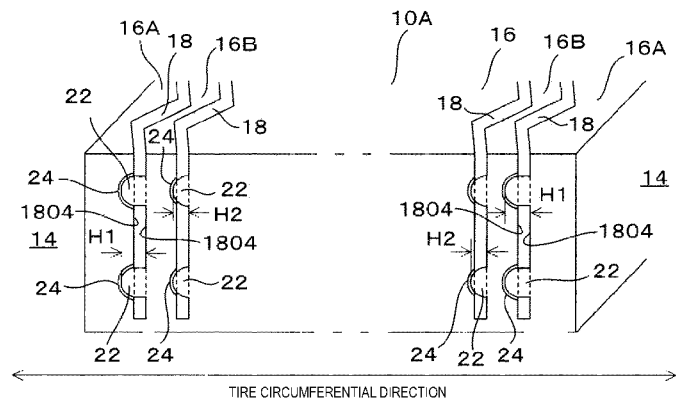
FIGS. 2A and 2B are explanatory views of the sipes, the protrusions, and the recesses; and are also perspective views of cross-sections of the portions of the block.
Figure 2B:
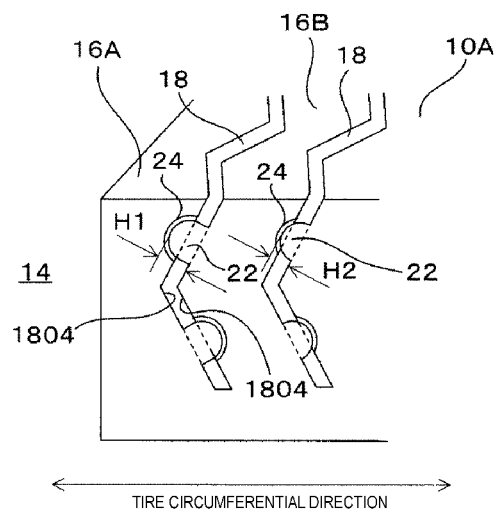

As illustrated in FIG. 2A, a depth of the sipes 18 may extend linearly in a direction perpendicular to the tread surface 10, or alternately, as illustrated in FIG. 2B, may extend in a bent manner from the tread surface 10.

In this embodiment, the sipes 18 have a uniform depth in the longitudinal direction thereof, with the exception of both ends. Both ends are configured so as to have a bottom-raising portion 1802 where a bottom surface is gradually raised.

In the sipes 18, protrusions 22 are formed on a first sipe wall surface of mutually opposing sipe wall surfaces 1804 and recesses 24 that engage with the protrusions 22 are formed on a second sipe wall surface. Collapsing of the portions of the blocks 16 sandwiched by the sipes 18 is suppressed due to the engaging of the protrusions 22 and the recesses 24. Specifically, due to the engaging of the protrusions 22 and the recesses 24 a configuration is obtained in which a force is generated that works to suppress bending deformation in the tire circumferential direction of the portions of the blocks 16.

More specifically, a plurality of the protrusions 22 and the recesses 24 are provided spaced in the longitudinal direction of the sipes 18 and a depth direction of the sipes 18.

The protrusions 22 have a height in a direction perpendicular to the sipe wall surfaces 1804.

As illustrated in FIGS. 2A and 2B, portions of the protrusions 22 protruding from the sipe wall surfaces 1804 may be provided with a cylindrical shape and ends thereof may be provided with a hemispherical shape. Alternately, an entirety of the protrusions 22 may be provided with a hemispherical shape. In short, it is sufficient that the protrusions 22 and the recesses 24 be provided with shapes that mutually engage when the portions 16A of the block 16 collapse so as to suppress the collapsing of the portions 16A of the block 16.

In the blocks 16, the protrusions 22 and the recesses 24 are configured so as to suppress collapsing in the tire circumferential direction of the portions 16A of the blocks 16 located at the edges in the tire circumferential direction more than the other portions 16B of the blocks 16. In other words, the protrusions 22 and the recesses 24 are formed so that the engaging between the portions 16A of the blocks 16 located at the edges in the tire circumferential direction and the portions 16B of the blocks 16 positioned adjacent to said portions 16A of the blocks 16 generates a force that works to suppress the bending deformation that is greater than the force generated by engaging between the other portions 16B of the blocks 16.

Specifically, in the first embodiment, as illustrated in FIGS. 2A and 2B, a height H1 of the protrusions 22 provided on the sipe wall surfaces 1804 of the sipes 18 located at the edges in the tire circumferential direction is greater than a height H2 of the protrusions 22 provided on the sipe wall surfaces 1804 of the other sipes 18.

In this case, the height H1 of the protrusions 22 provided on the sipe wall surfaces 1804 of the sipes 18 located at the edges in the tire circumferential direction is preferably not less than 1.2 times and not more than 3.0 times greater than the height H2 of the protrusions 22 provided on the sipe wall surfaces 1804 of the other sipes 18. More specifically, the height H2 of the protrusions 22 provided on the sipe wall surfaces 1804 of the other sipes 18 is preferably from about 0.5 to 3.0 mm.

By providing the protrusions 22 and recesses 24 on the sipe wall surfaces 1804 as described above, the protrusions 22 and the recesses 24 engage and collapsing of the portions 16A of the block 16 is suppressed. Thereby, a decline in contact area is suppressed and deformation of the block 16 is suppressed, which are advantageous for enhancing braking performance on ice.

More specifically, the portions 16A of the blocks 16 located at the edges in the tire circumferential direction are partitioned by the sipes 18 and a lateral groove 14 having a width greater than that of the sipes 18 and engaging between the protrusions 22 and the recesses 24 only occurs on one side of the portions 16A of the blocks 16. Therefore, these portions 16A are more prone to collapsing than the portions 16B of the blocks 16 located at other areas partitioned by adjacent sipes 18.

However, in the first embodiment, the height H1 of the protrusions 22 provided on the sipe wall surfaces 1804 of the sipes 18 located at the edges in the tire circumferential direction is greater than the height H2 of the protrusions 22 provided on the sipe wall surfaces 1804 of the other sipes 18.

In other words, when the portions 16A and 16B of the blocks 16 are subjected to a force from a road surface, bending deformation and collapsing begins to occur. At this time, the protrusions 22 and the recesses 24 engage, the force that is at work at the engaged portions acts to resist bending deformation, and bending deformation is suppressed. In other words, due to the protrusions 22 and the recesses 24 engaging, a force is generated that works to suppress bending deformation in the tire circumferential direction of the portions 16A and 16B of the blocks 16, and bending deformation is suppressed.

The protrusions 22 and the recesses 24 engage more firmly when the height H1 of the protrusions 22 is great and, therefore, the force that works to suppress the bending deformation is great. While the protrusions 22 and the recesses 24 only engage on one side, collapsing of the portions 16A of the blocks 16 located at the edges in the tire circumferential direction is suppressed.

Thus, according to this embodiment, collapsing of the portions 16A of the blocks 16 located at the edges in the tire circumferential direction is suppressed, a configuration in which the portions of the blocks collapse uniformly in the tire circumferential direction can be obtained, and edge effect can be enhanced, which is advantageous for enhancing braking performance on ice. Additionally, sipe peeling is reduced, which is advantageous for suppressing uneven wear.

Working Example 1

Figures 3, 4:
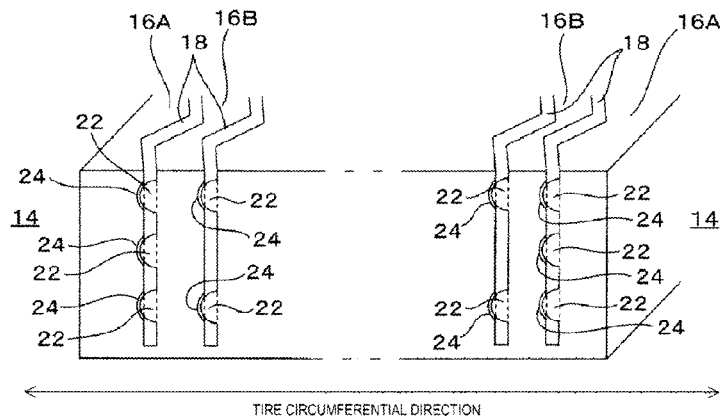
FIG. 3 is a table showing test results for dry braking, wet braking, and braking on ice.
FIG. 4 is an explanatory view of the sipes, the protrusions, and the recesses; and is also a perspective view of a cross-section of the portions of the block.

Radial studless tires having a tire size of 215/60R16 provided with protrusions 22 and recesses 24 that engage with these protrusions 22 having the configurations shown in FIGS. 1A and 3 were assembled on rims having a rim size of 16×7J. The tires were inflated to an inner pressure of 200 kPa and mounted on the four wheels of an RV vehicle having an engine displacement of 2,000 cc. Tests for a Conventional Example and Working Examples 1, 2, 3, and 4 were conducted for dry braking, wet braking, and braking on ice.

Note that the width W of the sipes 18 was 0.4 mm, the depth D was 6 mm, and the length L was 10 mm.

Dry braking was measured as a braking distance from a point of brake application to stop when traveling on a dry asphalt road surface at a speed of 100 km/h. Using the reciprocal of the braking distance, the results were expressed as index values with an index value of the Conventional Example being 100. Larger index values indicate superior braking performance.

Wet braking was measured as a braking distance from a point of brake application to stop when traveling on a wet asphalt road surface at a speed of 60 km/h. Using the reciprocal of the braking distance, the results were expressed as index values with an index value of the Conventional Example being 100. Larger index values indicate superior braking performance.

Braking on ice was measured as a braking distance from a point of brake application to stop when traveling on ice at a speed of 40 km/h. Using the reciprocal of the braking distance, the results were expressed as index values with an index value of the Conventional Example being 100. Larger index values indicate superior braking performance.

From Working Examples 1, 2, 3, and 4 shown in FIG. 3, it is clear that dry braking, wet braking, and braking on ice can be enhanced when the height of the protrusions 22 of the sipes 18 located at the edges in the tire circumferential direction is configured so as to be greater than the height of the protrusions 22 of the other sipes 18.

Additionally, from Working Example 3, it is clear that configuring the height of the protrusions 22 of the sipes 18 located at the edges in the tire circumferential direction to be two-times greater than the height of the protrusions 22 of the other sipes 18 is advantageous for enhancing dry braking, wet braking, and braking on ice.

Second Embodiment

In a second embodiment as well, a plurality of sipes 18 extending in a direction that intersects with the tire circumferential direction and spaced in the tire circumferential direction are provided in a tread surface 10A of blocks 16 partitioned by a plurality of vertical grooves 12 and lateral grooves 14, and protrusions 22 and recesses 24 that mutually engage and suppress the collapsing of the portions of the blocks 16 are provided on mutually opposing sipe wall surfaces 1804 in the sipes 18, the same as in the first embodiment.

Additionally, portions 16A of the blocks 16 located at edges in the tire circumferential direction are partitioned by the sipes 18 and a lateral groove 14 having a width greater than that of the sipes 18. Therefore, these portions 16A are more prone to collapsing than portions 16B of the blocks 16 located at other areas partitioned by adjacent sipes 18, the same as in the first embodiment.

In the second embodiment, as illustrated in FIGS. 4 and 5A to 5C, a proportion of the sipe wall surfaces 1804 occupied by a cross-sectional area of the protrusions 22, a proportion occupied by a cross-sectional area of the protrusions 22 and the recesses 24, or a proportion occupied by a cross-sectional area of the recesses 24, with respect to an area of the sipe wall surfaces 1804, for the sipe wall surfaces 1804 of the sipes 18 located at the edges in the tire circumferential direction is configured so as to be greater than for the sipe wall surfaces 1804 of the other sipes 18. In other words, the protrusions 22 and the recesses 24 are formed so that the engaging between the portions 16A of the blocks 16 located at the edges in the tire circumferential direction and the portions 16B of the blocks 16 positioned adjacent to said portions 16A of the blocks 16 generates a force that works to suppress the bending deformation that is greater than the force generated by engaging between the other portions 16B of the blocks 16.

Here, the proportion of the sipe wall surfaces 1804 occupied by the cross-sectional area of the protrusions 22, the proportion occupied by the cross-sectional area the protrusions 22 and the recesses 24, or the proportion occupied by the cross-sectional area of the recesses 24, with respect to an area of the sipe wall surfaces 1804, is not less than 1.2 times and not more than 3.0 times greater for the sipe wall surfaces 1804 of the sipes 18 located at the edges in the tire circumferential direction than for the sipe wall surfaces 1804 of the other sipes 18.

Figure 5A:
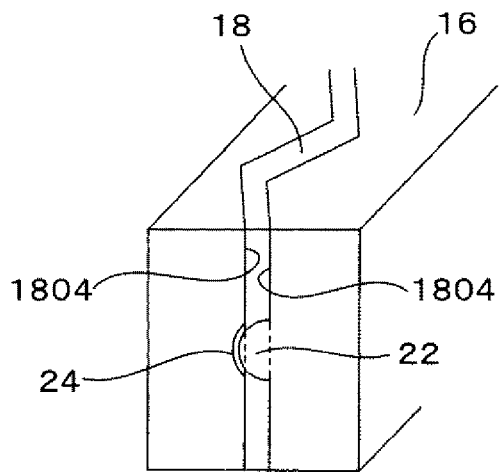
FIGS. 5A to 5C are explanatory diagrams of a proportion of a sipe wall surface occupied by a cross-sectional area of the protrusions, a proportion of the sipe wall surface occupied by a cross-sectional area of the protrusions and the recesses, or a proportion of the sipe wall surface occupied by a cross-sectional area of the recesses, with respect to an area of the sipe wall surface.

More specifically, as illustrated in FIG. 5A, when the protrusions 22 are formed on a first side wall 1804 of a pair of opposing side walls 1804 and 1804 in the sipes 18 and the recesses 24 are formed in a second side wall 1804, from the perspective of the first side wall 1804, the proportion of the sipe wall surfaces 1804 occupied by the cross-sectional area of the protrusions 22, with respect to the area of the sipe wall surfaces 1804, is greater for the sipes 18 located at the edges in the tire circumferential direction than for the other sipes 18. From the perspective of the second side wall 1804, the proportion of the sipe wall surfaces 1804 occupied by the cross-sectional area of the recesses 24, with respect to the area of the sipe wall surfaces 1804, is greater for the sipes 18 located at the edges in the tire circumferential direction than for the other sipes 18.

Figure 5B:
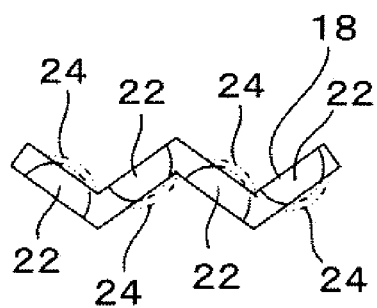
Figures 5C, 6:
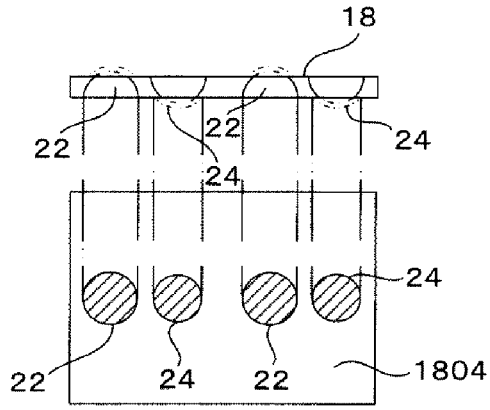
FIG. 6 is a table showing test results for dry braking, wet braking, and braking on ice.

Additionally, as illustrated in FIGS. 5B and 5C, when the protrusions 22 and the recesses 24 are both formed in the first side wall 1804, and the protrusions 22 and the recesses 24 are both formed in the second side wall 1804 of the pair of opposing side walls 1804 and 1804 in the sipes 18, from the perspective of the side walls 1804, the proportion of the sipe wall surfaces 1804 occupied by the cross-sectional area of the protrusions 22 and the recesses 24 with respect to the area of the sipe wall surfaces 1804 is formed greater for the sipes located at the edges in the tire circumferential direction than for the other sipes 18. Note that the height of the protrusions 22 is preferably from about 0.5 to 3.0 mm, the same as in the first embodiment.

Examples of methods that can be considered for varying the proportion of the sipe wall surfaces 1804 occupied by the cross-sectional area of protrusions and recesses (the protrusions 22 and the recesses 24) between the sipes 18 at the edges in the tire circumferential direction and the other sipes 18 include aspects of adjusting the number of the protrusions and recesses provided in the sipes 18 and varying the cross-sectional area of the protrusions and recesses.

In this embodiment, the number of protrusions and recesses provided in the sipes is adjusted. Specifically, as illustrated in FIG. 4, in the sipes 18 located at the edges in the tire circumferential direction, three of the protrusions 22 are provided spaced in the depth direction on the first sipe wall surface 1804 of the opposing sipe wall surfaces 1804 and 1804 in the sipes 18, and three of the recesses 24 that engage with the protrusions 22 are provided spaced in the depth direction on the second sipe wall surface 1804. Additionally, in the other sipes 18, two of the protrusions 22 are provided spaced in the depth direction on the first sipe wall surface 1804 of the opposing sipe wall surfaces 1804 and 1804 in the sipes 18, and two of the recesses 24 that engage with the protrusions 22 are provided spaced in the depth direction on the second sipe wall surface 1804.

In the second embodiment, the protrusions 22 and the recesses 24 engage and collapsing of the portions 16A of the block 16 is suppressed. Thereby, a decline in contact area is suppressed and deformation of the block 16 is suppressed, which are advantageous for enhancing braking performance on ice.

More specifically, the portions 16A of the blocks 16 located at the edges in the tire circumferential direction are partitioned by the sipes 18 and a lateral groove 14 having a width greater than that of the sipes 18. Therefore, these portions 16A are more prone to collapsing than the portions 16B of the blocks 16 located at other areas partitioned by adjacent sipes 18.

However, in this embodiment, a number of the protrusions 22 and the recesses 24 provided on the sipe wall surfaces 1804 of the sipes 18 located at the edges in the tire circumferential direction is greater than that of the protrusions 22 and the recesses 24 provided on the sipe wall surfaces 1804 of the other sipes 18. In other words, the proportion of the sipe wall surfaces 1804 occupied by the cross-sectional area of the protrusions 22 or the proportion occupied by the cross-sectional area of the recesses 24, with respect to an area of the sipe wall surfaces 1804, is configured so as to be greater for the sipes 18 located at the edges in the tire circumferential direction than for the other sipes 18.

In other words, when the portions 16A and 16B of the blocks 16 are subjected to a force from a road surface, bending deformation and collapsing begins to occur. At this time, the protrusions 22 and the recesses 24 engage, the force that is at work at the engaged portions acts to resist bending deformation, and bending deformation is suppressed. When the proportion of the sipe wall surfaces 1804 occupied by the cross-sectional area of the protrusions 22 or the proportion occupied by the cross-sectional area of the recesses 24 with respect to the area of the sipe wall surfaces 1804 is great, the protrusions 22 and the recesses 24 engage more firmly. Therefore, while the protrusions 22 and the recesses 24 only engage on one side of the portions 16A of the blocks 16, the force that works to suppress the bending deformation is great and collapsing of the portions 16A of the blocks 16 located at the edges in the tire circumferential direction is suppressed.

Thus, according to this embodiment, collapsing of the portions 16A of the blocks 16 located at the edges in the tire circumferential direction is suppressed, a configuration in which the portions of the blocks 16 collapse uniformly in the tire circumferential direction can be obtained, and edge effect can be enhanced, which is advantageous for enhancing braking performance on ice. Additionally, sipe peeling is reduced, which is beneficial for suppressing uneven wear.

Working Example 2

Radial studless tires having a tire size of 215/60R16 provided with protrusions 22 and recesses 24 that engage with these protrusions 22 having the configurations shown in FIGS. 1A and 6 were assembled on rims having a rim size of 16×7J. The tires were inflated to an inner pressure of 200 kPa and mounted on the four wheels of an RV vehicle having an engine displacement of 2,000 cc. Tests for a Conventional Example and Working Examples 1, 2, 3, and 4 were conducted for dry braking, wet braking, and braking on ice.

Note that the width W of the sipes 18 was 0.4 mm, the depth D was 6 mm, and the length L was 10 mm.

Dry braking was measured as a braking distance from a point of brake application to stop when traveling on a dry asphalt road surface at a speed of 100 km/h. Using the reciprocal of the braking distance, the results were expressed as index values with an index value of the Conventional Example being 100. Larger index values indicate superior braking performance.

Wet braking was measured as a braking distance from a point of brake application to stop when traveling on a wet asphalt road surface at a speed of 60 km/h. Using the reciprocal of the braking distance, the results were expressed as index values with an index value of the Conventional Example being 100. Larger index values indicate superior braking performance.

Braking on ice was measured as a braking distance from a point of brake application to stop when traveling on ice at a speed of 40 km/h. Using the reciprocal of the braking distance, the results were expressed as index values with an index value of the Conventional Example being 100. Larger index values indicate superior braking performance.

From the Working Examples 1, 2, 3, and 4 shown in FIG. 6 it is clear that dry braking, wet braking, and braking on ice can be enhanced when a proportion of the sipe wall surfaces 1804 occupied by a cross-sectional area of the protrusions 22, a proportion occupied by a cross-sectional area the protrusions 22 and the recesses 24, or a proportion occupied by a cross-sectional area of the recesses 24, with respect to an area of the sipe wall surfaces 1804, for the sipes 18 located at the edges in the tire circumferential direction, is configured so as to be greater than for the other sipes 18.

Additionally, from Working Example 3, it is clear that configuring a proportion of the sipe wall surfaces 1804 occupied by a cross-sectional area of the protrusions 22, a proportion occupied by a cross-sectional area the protrusions 22 and the recesses 24, or a proportion occupied by a cross-sectional area of the recesses 24, with respect to an area of the sipe wall surfaces 1804, so as to be two-times greater for the sipes 18 located at the edges in the tire circumferential direction than for the other sipes 18 is advantageous for enhancing dry braking, wet braking, and braking on ice.

What is claimed is:

1. A pneumatic tire comprising:
   in a tread portion, a plurality of blocks partitioned by a plurality of vertical grooves extending in a tire circumferential direction and a lateral groove extending in a direction that intersects with the tire circumferential direction, and
   in a tread surface of the blocks, at least three sipes spaced in the tire circumferential direction extending in the direction that intersects with the tire circumferential direction, wherein portions of the blocks partitioned by the lateral groove and the sipes are formed at areas of the blocks located at both edges in the tire circumferential direction, and portions of the blocks partitioned by sipes adjacent in the tire circumferential direction are formed in other areas of the blocks, wherein
   in the sipes, protrusions are formed on a first sipe wall surface of mutually opposing sipe wall surfaces, and recesses that can engage with the protrusions are formed in a second sipe wall surface;
   the protrusions and the recesses are configured so as to generate a force by engaging that works to suppress bending deformation in the tire circumferential direction of the portions of the blocks;
   the protrusions and the recesses are formed so that the engaging between the portions of the blocks located at the both edges in the tire circumferential direction and the portions of the blocks positioned adjacent to said portions of the blocks generates a force that works to suppress the bending deformation that is greater than the force generated by engaging between other portions of the blocks;

the protrusions have a height in a direction perpendicular to the sipe wall surface;

diameters of the protrusions are substantially constant; and in the blocks, the height of the protrusions provided on the sipe wall surface of the sipes that partition the portions of the blocks located at the both edges in the tire circumferential direction is greater than the height of the protrusions provided on the sipe wall surface of the sipes that partition the center portions located between the both edges of the blocks.

2. The pneumatic tire according to claim 1, wherein in the blocks, the height of the protrusions provided on the sipe wall surface of the sipes that partition the portions of the blocks located at the edges in the tire circumferential direction is formed with dimensions not less than 1.2 times and not more than 3.0 times greater than the height of the protrusions provided on the sipe wall surface of the sipes that partition the other portions of the blocks.

3. The pneumatic tire according to claim 1, wherein a width of the sipes is between approximately 0.3 mm and 1.5 mm.

4. The pneumatic tire according to claim 1, wherein a longitudinal direction of the sipes extends in a zigzag shape.

5. The pneumatic tire according to claim 1, wherein a depth of the sipes extends linearly in a direction perpendicular to the tread surface.

6. The pneumatic tire according to claim 1, wherein the protrusions have a height in a direction perpendicular to the sipe wall surface, and the height of the protrusions provided on the sipe wall surface of the sipes that partition the portions of the blocks located at the edges in the tire circumferential direction is from about 0.5 to 3.0 mm.

7. The pneumatic tire according to claim 1, wherein the protrusions have a height in a direction perpendicular to the sipe wall surface, and the height of the protrusions provided on the sipe wall surface of the sipes that partition the portions of the blocks located at the edges in the tire circumferential direction is from about 1.2 to 3.0 mm.

8. The pneumatic tire according to claim 1, wherein the protrusions have a height in a direction perpendicular to the sipe wall surface, and the height of the protrusions provided on the sipe wall surface of the sipes that partition the portions of the blocks located at the edges in the tire circumferential direction is from about 1.5 to 3.0 mm.

9. The pneumatic tire according to claim 1, wherein the protrusions have a height in a direction perpendicular to the sipe wall surface, and the height of the protrusions provided on the sipe wall surface of the sipes that partition the portions of the blocks located at the edges in the tire circumferential direction is from about 2.0 to 3.0 mm.

10. The pneumatic tire according to claim 1, wherein the protrusions have a height in a direction perpendicular to the sipe wall surface, and the height of the protrusions provided on the sipe wall surface of the sipes that partition the portions of the blocks located at the edges in the tire circumferential direction is from about 1.5 to 2.0 mm.

11. The pneumatic tire according to claim 1, wherein the sipes have a uniform depth in a longitudinal direction thereof, with the exception of ends thereof which include a bottom-raising portion where a bottom surface is gradually raised.

12. The pneumatic tire according to claim 1, wherein portions of the protrusions protruding from the sipe wall surfaces have a cylindrical shape.

13. The pneumatic tire according to claim 12, wherein ends of the protrusions protruding from the sipe wall surfaces have a hemispherical shape.

14. The pneumatic tire according to claim 1, wherein portions of the protrusions protruding from the sipe wall surfaces have a hemispherical shape.

15. The pneumatic tire according to claim 14, wherein an entirety of the protrusions has the hemispherical shape.

16. The pneumatic tire according to claim 14, wherein the recesses are shaped to receive a substantial entirety of the hemispherical shape.

17. The pneumatic tire according to claim 1, wherein the protrusions comprise at least one of a hemispherical shape, a cylindrical shape with ends thereof having a hemispherical shape, or a cylindrical shape with ends thereof having a truncated conical shape.

\* \* \* \* \*